Figure 8:
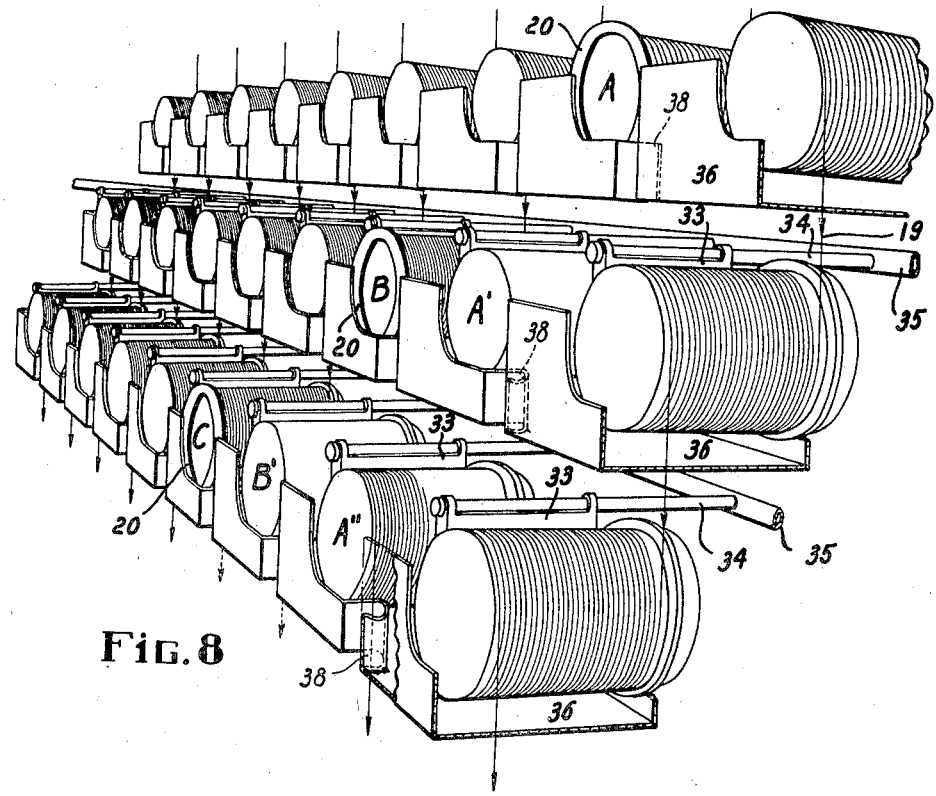

Jan. 7, 1941.  W. F. KNEBUSCH ET AL  2,227,723
METHOD OF MANIPULATING THREAD OR THE LIKE
Filed Jan. 4, 1939  4 Sheets-Sheet 1
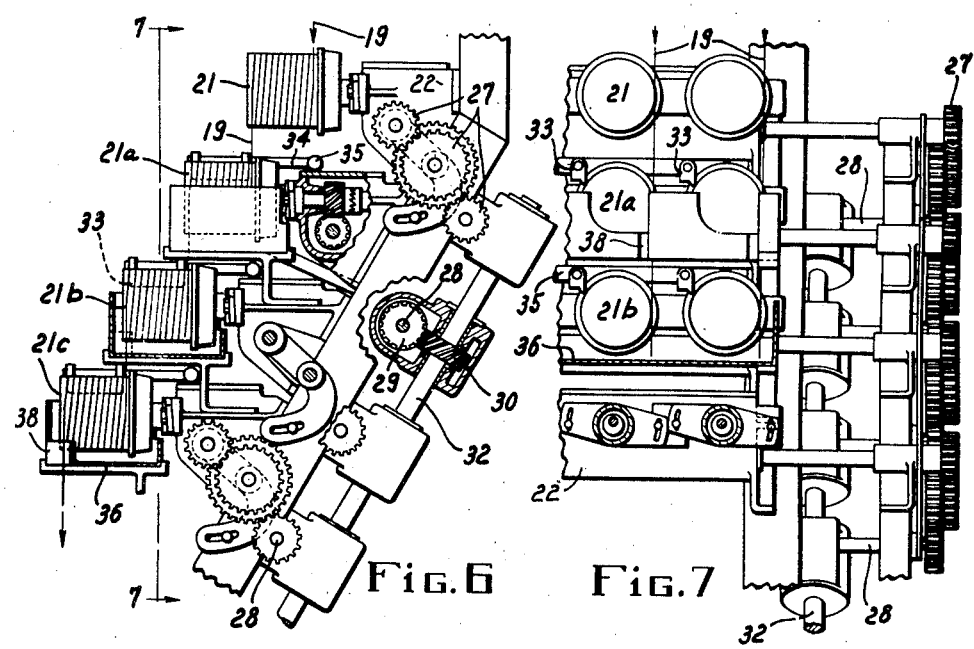
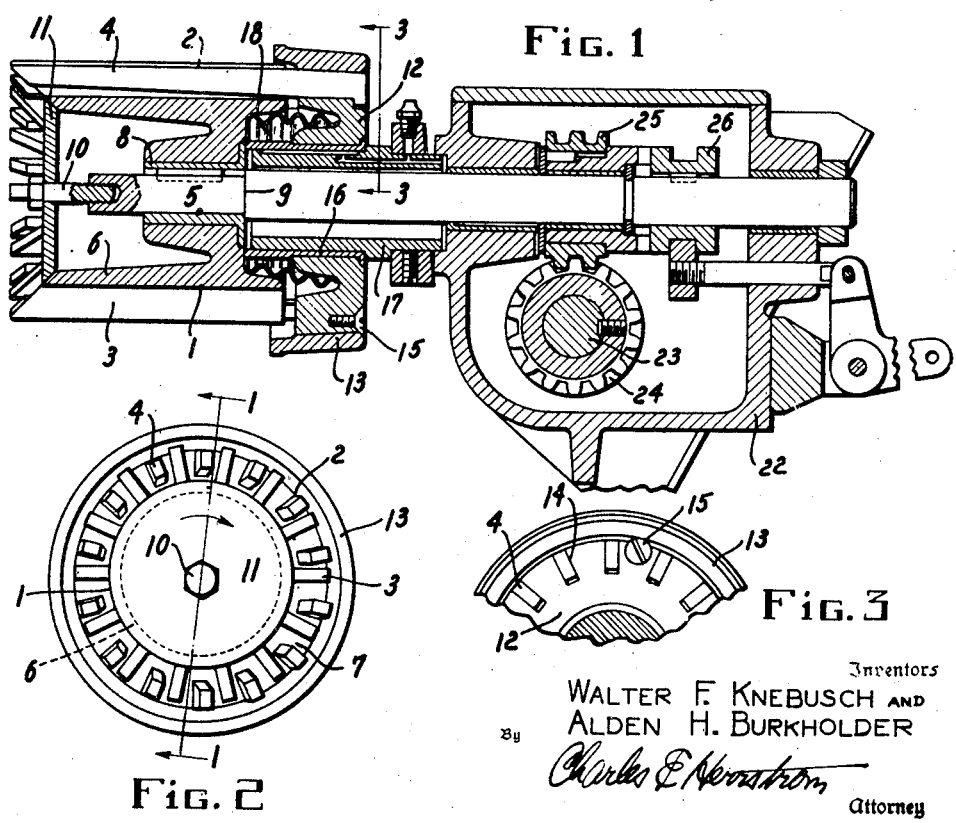
Inventors
WALTER F. KNEBUSCH AND
ALDEN H. BURKHOLDER
By Charles E. Hernstrom
Attorney Jan. 7, 1941.   W. F. KNEBUSCH ET AL   2,227,723
METHOD OF MANIPULATING THREAD OR THE LIKE
Filed Jan. 4, 1939   4 Sheets-Sheet 2

Inventors
WALTER F. KNEBUSCH AND
ALDEN H. BURKHOLDER
By Charles E. Harrison
Attorney

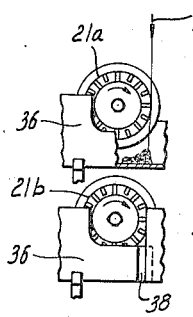
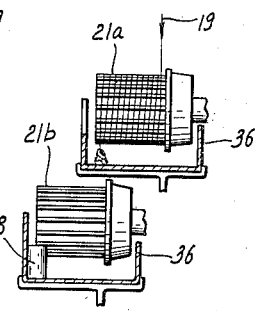
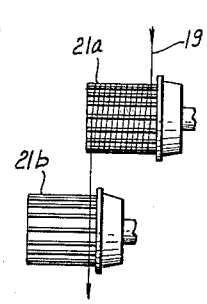
Fig. 9  Fig. 10  Fig. 11  Fig. 12
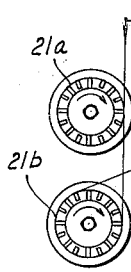
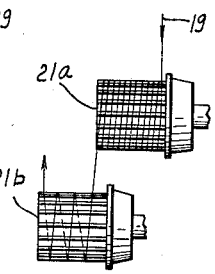
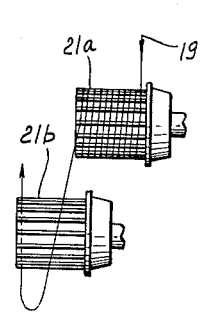
Fig. 13  Fig. 14  Fig. 15  Fig. 16
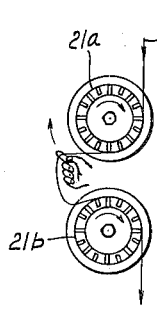
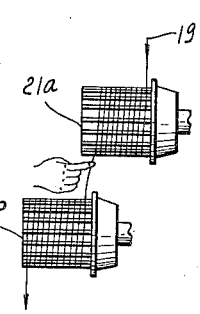
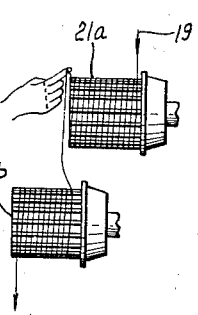
Fig. 29  Fig. 30  Fig. 31  Fig. 32

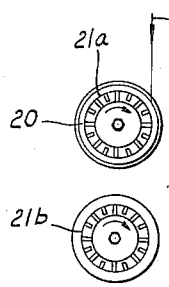 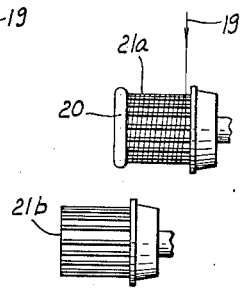 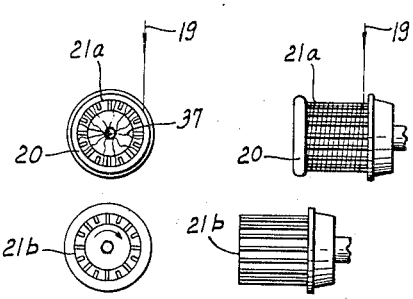
Fig.17　Fig.18　Fig.19　Fig.20
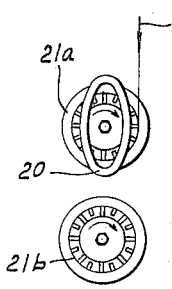 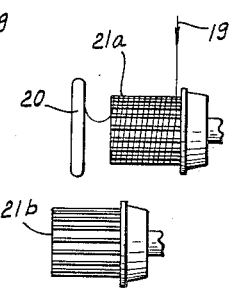 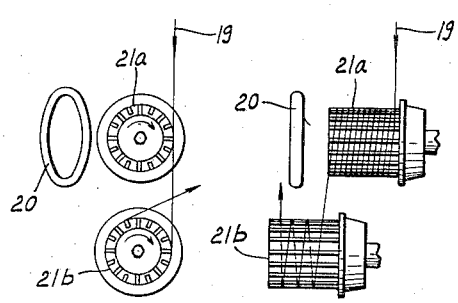
Fig.21　Fig.22　Fig.23　Fig.24
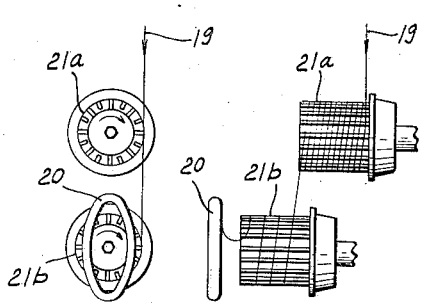 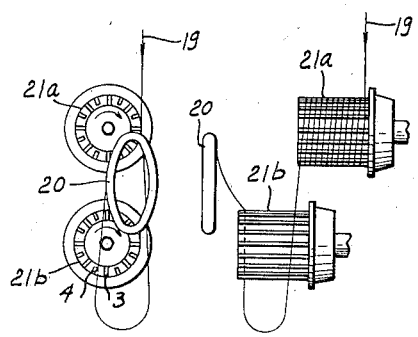
Fig.25　Fig.26　Fig.27　Fig.28
Inventors
WALTER F. KNEBUSCH AND
ALDEN H. BURKHOLDER
Attorney Patented Jan. 7, 1941

2,227,723

UNITED STATES PATENT OFFICE 2,227,723

METHOD OF MANIPULATING THREAD OR THE LIKE

Walter F. Knebusch, Rocky River, and Alden H. Burkholder, Cleveland, Ohio, assignors to Industrial Rayon Corporation, Cleveland, Ohio, a corporation of Delaware Application January 4, 1939, Serial No. 249,272

8 Claims. (Cl. 18—54)

This invention relates to methods of manipulating thread or the like on one or more unilaterally supported thread-advancing thread store devices. The invention has particular utility in the processing of thread or the like, as, for example, in the manufacture of multiple filament viscose artificial silk thread, pursuant to a method by which the thread or the like is processed while being continuously but temporarily stored in a series of generally helical turns on each of a plurality of thread-advancing thread store devices. The invention is applicable to the manipulation of thread-like articles generally, hereinafter referred to as "thread."

In the manufacture of multiple filament viscose artificial silk thread, it has been found desirable, because of the large number of processing operations which must be performed upon the thread, to employ a considerable number of thread-advancing thread store devices for each thread; indeed, as many as ten thread-advancing thread store devices may advantageously be employed in the production of each thread. Since several thousand threads must be produced simultaneously in a single plant in order to obtain the necessary commercial production, the number of thread-advancing thread store devices which must be employed in such a plant may therefore approach one hundred thousand. From time to time all of such devices must be threaded up and the leading ends of the threads transferred from device to device.

While apparatus for the manufacture of multiple filament viscose artificial silk thread by a continuous process, after having once been completely threaded up, may run for months at a time without being shut down, the individual thread-advancing thread store devices must be threaded up more often than at first appears. For one thing, all of the devices must be threaded up and the leading ends of the threads must be transferred from device to device every time the machine as a whole is started. This in itself is a task of no small magnitude. Thereafter, whenever a thread is broken for any reason— and a certain amount of breakage is bound to occur—all the devices of the series located subsequent to the point of breakage must be threaded up, in connection with which the leading end of the thread must be transferred therebetween. Whenever a spinneret, spinning pump, or the like is cleaned, repaired, or replaced, the continuity of the thread must be interrupted, with the same consequences.

For such reasons, it may be necessary each day to perform hundreds, if not actually thousands, of threading-up and transfer operations in a plant of average size.

Because of the large number of thread-advancing thread store devices employed; i. e., the large number of threading-up operations and thread transfers which must be effected, it is extremely important that it be possible to thread up and transfer the thread between the thread-advancing thread store devices as expeditiously as possible. Otherwise, so much time and labor will be consumed in these operations as to render the use of a continuous processing system commercially impracticable. In the threading up of such thread-advancing thread store devices and in the transfer of thread therebetween the present invention provides methods of manipulating the thread by methods which are efficient, which require a minimum of time and labor, and which make the use of a continuous processing system practicable.

For purposes of illustration, the methods of the present invention will be discussed in connection with the manufacture of multiple filament viscose artificial silk thread according to a continuous process by a machine of a type falling within the scope of the claims of copending application Serial No. 7,113, filed February 18, 1935, in the name of Walter F. Knebusch. In particular, the methods of the present invention will be discussed for purposes of illustration in connection with thread-advancing thread store devices of the type shown in the above-identified application. The thread-advancing thread store devices of such application take the form of reels of cantilever form; i. e., reels supported and driven from one end only and having the other end unobstructed by anything impeding the discharge of the thread. On such reels the thread is advanced toward the unsupported end in a large number of closely spaced, generally helical turns.

Figure 4:
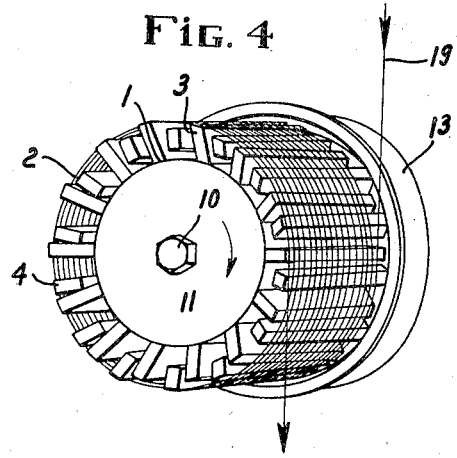
Figure 5:
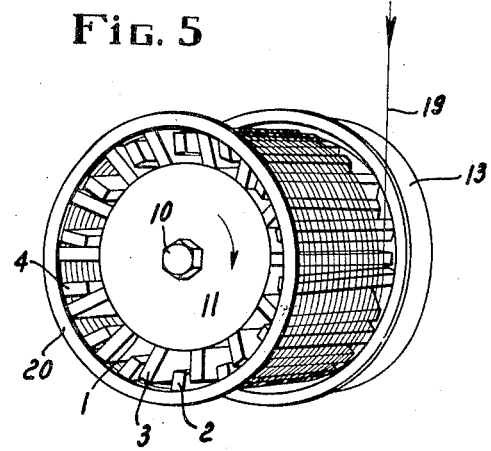

In the accompanying drawings, in which are illustrated several methods of practicing the invention, Figure 1 represents a sectional elevation through a thread-advancing reel and associated portions of the apparatus, the section through the reel being generally along line 1—1 of Figure 2. Figure 2 is an end elevation of the reel corresponding to the left-hand end of Figure 1. Figure 3 is a detail sectional elevation of the reel along line 3—3 of Figure 1. Figure 4 is a perspective of a reel as employed in connection with the present invention showing the reel in normal operation. Figure 5 is a perspective of a reel as employed in connection with the present invention showing the annular bundle of thread which forms under certain conditions at the unsupported end of the reel.

Figure 6 is a side elevation of a portion of an apparatus for the continuous processing of thread in connection with which the present invention may be employed, the reels being shown more or less diagrammatically. Figure 7 is an elevation partly in section from line 7—7 of Figure 6 of a portion of the front of said apparatus. Figure 8 is an elevation in perspective of a portion of the front of said apparatus showing the relationship of the reels to each other. The remaining figures are diagrammatic representations illustrating methods within the scope of the present invention of starting the thread on the reels and transferring the thread therebetween.

In such figures, Figures 9 and 10, respectively end and side elevations of two associated reels, illustrate one method of manipulating the thread. Figures 11 and 12 are respectively end and side elevations of two associated reels showing the contact method of transferring thread from one reel to another. Figures 13 and 14 are respectively end and side elevations of two reels showing the winding or looping method of transferring thread from one reel to another. Figures 15 and 16 are respectively end and side elevations of two reels showing a method of transferring thread from a preceding reel to a succeeding reel involving the engagement of thread between the bar members of the succeeding reel.

Figures 17 and 18 are respectively end and side elevations of two reels showing the thread bundle which may form under suitable circumstances at the unsupported end of a completely threaded reel. Figures 19 and 20 are respectively end and side elevations of two reels showing a bundle and web of thread which may form under suitable circumstances at the unsupported end of a completely threaded reel. Figures 21 and 22 are respectively end and side elevations of two reels illustrating the removal of a bundle of thread turns from the unsupported end of a reel. Figures 23 and 24 are respectively end and side elevations of two reels showing the method of transferring the thread from one reel to another after the bundle has been severed from the thread.

Figures 25 and 26 are respectively end and side elevations of two reels illustrating the method of transferring the thread from one reel to another involving the severance of the bundle from the thread after the thread transfer has been made.

Figures 27 and 28 are respectively end and side elevations of two reels representing the method of transferring the thread by engaging it when a bundle is present. Figures 29 and 30 are respectively end and side elevations of two reels showing how thread may be wound on a reel over the unsupported end thereof while the thread is passing to a succeeding device. Figures 31 and 32 are respectively end and side elevations of two reels showing how thread may be unwound from a reel over the unsupported end thereof while the thread is passing to a succeeding device.

One form of reel which may be advantageously employed in connection with the invention is shown in Figures 1 to 5, inclusive. Said reel comprises two wholly rigid, generally cylindrical reel members 1 and 2. Reel member 1 has a thread-bearing periphery comprising a plurality of spaced longitudinally extending bar members 3, while reel member 2 has a thread-bearing periphery comprising a plurality of spaced longitudinally extending bar members 4. The bar members of the two reel members interdigitate, being alternately disposed. Each of the reel members is mounted for rotation about its own fixed axis, the axes of the two reel members in the illustrated reel being disposed in offset and inclined relation to each other in spaced, parallel planes. The reel is mounted from one end only, having its other end unobstructed by supporting means, driving means, etc.

In the illustrated reel, reel member 1 may be termed the concentric reel member, since it is mounted concentrically upon, fixed to, and adapted to rotate with drive shaft 5. It comprises a hollow generally cylindrical body portion 6 on which are rigidly mounted the bar members 3. The periphery of the body portion is slotted to form alternating bar members 3 and recesses 7, in which recesses are disposed the bar members 4 of the other reel member 2. The reel member 1 is mounted on a sleeve 8 keyed to the shaft 5 and is held in place against a shoulder 9 in the drive shaft 5 by means of a cap screw 10 threaded into the end of the shaft, the cap screw 10 passing through and clamping in place an imperforate disc 11 which seats against and seals the corresponding beveled body portion 6. All portions of reel member 1 are immovable with respect to each other, so that there is obtained a strong, rigid reel member.

The member 2 of the illustrated reel may be termed the eccentric member, because while it is of generally cylindrical form and is concentric with its axis of rotation, it is mounted with its axis offset and inclined to the axis of drive shaft 5. The eccentric member 2, all parts of which are likewise immovable with respect to all other parts thereof, includes a head formed of inner ring 12 and outer ring 13, said inner ring 12 having peripheral slots 14 therein to receive the bar members 4. Rings 12 and 13 are respectively externally and internally tapered as shown, being held together by screws 15. The bar members 4 are rigidly clamped between the rings at one end thereof, said bar members projecting between the bar members 3 of the concentric reel member 1. The inner ring 12 has fixed therein a sleeve 16 by means of which eccentric reel member 2 is journalled on a supporting member 17 in the desired offset and inclined relation. By such construction the reel may, as shown, be supported and driven from one end only, leaving its other end substantially unobstructed.

In the embodiment shown, concentric member 1 is molded of hard rubber, Bakelite, or similar material, being molded around or having rigidly fixed therein the central metal sleeve 8. The disc 11, which aids in clamping the concentric member 1 on the drive shaft 5, may also be made of or coated with hard rubber, Bakelite, or similar material. Eccentric member 2 may be similarly made up of parts formed of hard rubber, Bakelite, or similar materials. A flexible sealing sleeve 18, which may be made of rubber or like material, may be disposed between the two reel members 1 and 2 to protect the bearings and other metal parts of the reel.

The illustrated reel operates in the same manner as the reel shown, described and claimed in copending application Serial No. 652,089, filed January 16, 1933.

The rotation of drive shaft 5 causes concentric reel member 1 fixed thereto to rotate about its own axis. Contact of the bar members 3 of said reel member 1 with the bar member 4 of eccentric reel member 2 causes said eccentric reel member 2 to rotate about its own axis. Therefore, during the operation of the reel, both reel members rotate at the same angular speed, each about its own axis. Because of the offset relationship of the axes of the two reel members, each turn of thread on the reel is carried alternately by each of the two reel members, and, as the reel members rotate, the thread in each turn passes from one reel member to the other. While the thread is carried in part by the bar members of both reel members, the inclined relationship of the axes of rotation of the reel members causes the thread to advance lengthwise of the reel in a plurality of spaced, generally helical turns.

By suitable relationship of the direction of offset, direction of inclination of the axes of the reel members, and the direction of rotation of the reel members, it is possible to cause the thread to advance toward the unsupported end of the reel. In this manner, the cantilever feature of the reel can be utilized to the greatest advantage. In the case of the illustrated reel, for instance, the thread turns may be advanced toward the free end of the reel if the reel is rotated in a clockwise direction when viewed from the unsupported end; that is, when the reel is rotated in the direction indicated by the arrows in Figures 2, 4, and 5.

Since the reel comprises two generally cylindrical sets of interdigitating bar members, the peripheries formed of said sets of bar members necessarily intersect. Therefore, the reel is self-threading; that is, if a thread is merely brought into contact with the reel as it is rotating, or is at most wound about the reel once or twice, the thread will, by the action of the reel members, be caused to wind on the reel and form a plurality of spaced generally helical turns which advance longitudinally of the reel. If, as is the case with the illustrated reel, the reel is self-threading, is supported from one end only, has no drive shaft or other extension which obstructs the unsupported end of the reel, and effects an advance of the thread toward the unsupported end of the reel, numerous advantages are provided.

A fully threaded reel of this type to which the thread 19 is passing and from which it is leaving is shown in Figure 4, the direction of rotation of the reel and the direction of travel of the thread being indicated by the arrows. This condition obtains in normal operation of the reel. Figure 5 shows in perspective a fully threaded reel to which the thread 19 is passing, but from which the thread 19 is not being led, the direction of rotation of the reel and direction of travel of the thread 19 to the reel being indicated by the arrows. In the case illustrated in this figure, the thread reaching the open end of the reel forms an annular bundle 20 which clings to the ends of the bar members 3 and 4 at such end of the reel.

The annular bundle 20 of thread 19 forms under certain circumstances, but most effectively when the thread is wet. Such annular bundle forms because of the adhesion of the discharged thread turns to each other and to the reel. With a wet thread, when the leading turns of thread 19 first reach the unsupported end of the reel, they do not tend to discharge therefrom but cling to the reel. Succeeding thread turns in effect pile up against such leading turns. In time a large annular bundle is formed, which, if permitted to grow, eventually drops off the reel, after which another bundle begins to form. The bundle in no way entangles about the reel, but drops entirely free of the reel.

The above-described annular bundle of thread will form at the unsupported end of the reel when the sets of bar members are of the same length, as shown in Figure 1; that is, if the planes in which the ends of the bar members of the two sets lie intersect in a line which passes substantially through the center of the end of the reel. However, it has been found that the formation of the annular bundle is facilitated if the bar members of one of the reel members are made somewhat shorter than the bar members of the other reel member; that is, if the planes in which the ends of the bar members of the inclined reel members lie intersect in a line removed from the center of the end of the reel.

Under such circumstances, the bar members of one set project somewhat beyond those of the other set and therefore carry the thread alone at this portion of the reel. On the portion of the reel back of the unsupported end thereof, the thread is positively advanced by cooperation of the bar members of both sets. On the short portion of the reel on which the thread is carried by the bar members of one set only, the thread is not positively advanced but is pushed forward in a more or less compact annular bundle by the action of the thread turns discharged from the portion of the reel on which the thread is supported by the bar members of both reel members. Thus the formation of the annular bundle is facilitated, particularly since it is possible for the projecting ends of the bar members of one of the sets to support the annular bundle. Under suitable circumstances a web of thread will form across the unsupported end of the reel, either alone or in conjunction with an annular bundle.

As shown in said Figures 6 to 8, inclusive, the apparatus as a whole preferably comprises a plurality of descending series of reels, each of which series is made up of several reels 21, 21a, 21b, 21c, etc., disposed in processing sequence. By means of each descending series of reels a single thread 19 from a suitable source, such as a spinneret disposed in a coagulating bath (not shown), is subjected to suitable or necessary processing treatments. The reels in the several descending series are disposed with their unsupported ends extending in the same direction, corresponding reels in processing sequence in adjacent series being disposed in corresponding positions horizontally of the machine. The reels, moreover, are disposed in stepped arrangement with the axes of all reels substantially horizontal and with the unsupported end of each preceding reel in apposite relation to the supported end of the next succeeding reel. Therefore the thread may pass directly from the unsupported end of each preceding reel to the supported end of the succeeding reel.

By reference to Figure 1, it can be seen that the drive shaft 5 for each reel is journalled in the opposite vertical walls of housing 22 which may extend longitudinally of the machine as shown in Figure 7 and serve to support several corresponding reels. The supporting member 17 for the reel is mounted on said housing. Each of the reels thus supported by the housing is driven from the drive shaft 23, extending longitudinally of the housing, through gears 24 and 25. In the illustrated embodiment of the invention, the gear 25 is rotatably mounted on the drive shaft 5 of the reel and is connected thereto by a clutch 26. The drive shaft 23 for a plurality of reels disposed in a horizontal series is driven through change speed gears 27 (Figures 6 and 7) from a short shaft 28 on which is mounted a helical gear 29 meshing with a helical gear 30 mounted on main drive shaft 32.

No means are shown for applying processing medium to the thread on reel 21, since it is intended that in the illustrated apparatus said reel be employed as a holding reel to provide a period of coagulation for the thread before it passes to the succeeding reels on which the thread is subjected to liquid processing treatment. The succeeding reels in the apparatus shown are provided with means for applying processing liquids to the thread and collecting such liquids. In the design shown, since corresponding reels in adjacent processing series are disposed in corresponding positions longitudinally of the apparatus, each of the reels in each corresponding processing stage has mounted thereabove a suitable reagent distributor 33 supplied through pipe 34 from a supply conduit 35 running horizontally of the machine. Below reels disposed in corresponding positions horizontally of the apparatus is a collecting trough 36, which serves to collect the processing liquid after it leaves the reel. Each of said collecting troughs communicates by suitable means with a common sewer or, if it is desired to re-use the processing liquid, with suitable recirculation and make-up means (not shown).

Figure 8 also illustrates how the reels of the present invention indicate that they are completely threaded up, or when breakage of the thread has occurred, by the formation of the annular bundle or web of thread at the open end of the reel.

In Figure 8 annular bundles 20 are formed at the open ends of the reels indicated by the letters A, B, and C, such bundles indicating either that each of these reels is completely threaded up, or that the thread has broken. In either event, such annular bundles form signals to the operator that the thread should be transferred from such reels to the next succeeding reels A', B', etc. As is apparent from this figure, even if the operator is a considerable distance away, he can tell at a glance the condition of the thread on all reels. It is further apparent from this illustration that even though it might be inconvenient for the operator to return immediately to complete the transfer of the thread, no harm will be done, since when the bundles grow to a certain size they merely drop off the open end of the reels into the trough.

As is apparent from Figures 6 to 8, inclusive, the troughs 36 are provided with recessed portions 38 below the discharge points of the preceding reels, through each of which recessed portions 38 the thread 19 can pass directly from the corresponding preceding reel to the succeeding reel.

Methods of manipulating the thread embodied in the present invention will be discussed hereinafter in connection with Figures 9 to 32, inclusive, which diagrammatically represent reels in the relationship embodied in the above-described apparatus for continuously processing thread. In the method of manipulating thread in Figures 9 and 10, for example, the thread 19, after being started on reel 21a, passes to the reel and is advanced therealong toward the unsupported end thereof. The thread is discharged from the unsupported end thereof, the discharged thread collecting in a mass in trough 36 below the reel. Thereafter the thread may be picked up and manually transferred to and started on the succeeding reel 21b by one of the methods embraced by the present invention. Usually, however, in transferring thread from a fully threaded preceding reel to a succeeding reel, it is desirable to withdraw one or more turns of thread substantially axially of the reel and then effect the transfer.

When thread 19 is wet and of the size of ordinary thread, it will tend to adhere to a reel when it is brought into contact with it. Under such circumstances, and as shown in Figures 11 and 12, thread 19 may be led from the threaded reel 21a and brought into contact with the succeeding reel 21b. The thread will adhere to such reel and will be advanced in a plurality of generally helical turns toward the free end of the reel. Regardless, however, of whether the thread is wet or dry, it may be started on the succeeding reel according to the method shown in Figures 13 and 14. Pursuant to such method, thread 19 is led from reel 21a and wound or looped one or more times around reel 21b, which enables thread 19 to be securely gripped by and wound around reel 21b.

The thread may be transferred to and also started on a succeeding reel by positively engaging the thread between the bar members 3 and 4 of the succeeding reel at the free end thereof, even while it is rotating. As shown in Figures 15 and 16, which illustrate this method, the thread 19 is led from reel 21a which is threaded up, downward alongside reel 21b, and is then engaged between any two bar members 3 and 4 at the free end of the reel 21b by drawing the thread upward across the unobstructed end of said reel. The rotation of the reel 21b will cause thread 19 to wind around said reel, the thread passing back along the reel to the supported end thereof and starting thereon due to the fact that the thread assumes the shortest path between the reels 21a and 21b.

As has been explained, under suitable circumstances a bundle or web of thread is formed at the unsupported end of a reel. Figures 17 and 18 diagrammatically illustrate the formation of a bundle 20, while Figures 19 and 20 show the formation of a web 37 across the unsupported end of the reel. When a web forms, it ordinarily forms in conjunction with a bundle 20. The web 37 or bundle 20 may be removed axially from the preceding reel 21a and the thread 19 may be transferred to and started on the succeeding reel 21b by any of the methods hereinbefore and hereinafter described.

For convenience in presentation, the manipulation of the thread discussed hereinafter is that applicable if a bundle alone is formed, but it will be appreciated that such methods of manipulation are equally applicable to a web alone or when both a web and a bundle are formed. In each case, transfer of thread from preceding reel 21a to succeeding reel 21b involves the axial removal of the bundle 20 from preceding reel 21a. The operator merely engages the bundle 20 and draws it toward and over the unsupported end of reel 21a as shown in Figures 21 and 22.

If desired, the removed bundle 20 may be severed from the thread 19 before the thread is started on the succeeding reel. This may be accomplished in various manners, as by cutting the thread or by holding said bundle 20 in one hand and grasping the thread 19 with the other hand between the bundle and reel 21a from which it was removed, breaking such thread either before or while starting the thread on the succeeding reel 21b. Figures 23 and 24 illustrate this method, the thread being shown as started on succeeding reel 21b by winding it about the reel as has been described in connection with Figures 13 and 14.

However, the bundle 20 need not be severed from the thread 19 until after the transfer has been completed. As shown in Figures 25 and 26, after the bundle 20 has been axially removed from reel 21a, the thread 19 is transferred to and started on reel 21b in any desired manner, as by winding the thread about reel 21b until it is firmly engaged thereby. The thread 19 connecting the bundle 20 with the thread 19 on reel 21b may then be severed in any suitable manner, as by cutting operation, by breaking the thread by holding the bundle in one hand and the thread in the other, or by jerking the bundle away from the reel 21b after it has become firmly gripped by reel 21b.

The bundle 20 may be removed from preceding reel 21a and the thread transferred to succeeding reel 21b by the method illustrated in Figures 27 and 28. According to this method, the thread between the bundle and preceding reel 21a is positively engaged between any two bar members 3 and 4 at the unsupported end of reel 21b. The thread proceeds to wind on the reel as described in connection with Figures 15 and 16. The bundle 20 may then be severed as described in the paragraph immediately preceding, thus allowing reel 21b to thread up completely without further attention on the part of the operator. Of course, immediately after the bundle is removed from the preceding reel 21a the thread between the bundle and said reel may be severed as previously described, after which the leading end of the thread may be started on the succeeding reel 21b by engaging it with the bar members 3 and 4 as hereinabove described.

After a reel is completely threaded up; i. e., after the thread stored thereon is leaving the reel in a path substantially at right angles to the axis of rotation of the reel, turns of thread may be added to or subtracted from the number on the reel while the reel is rotating without interfering in any way with the operation of the reel and without severing the thread or otherwise interrupting the passage thereof. This may be accomplished by forming a bight in the thread leaving the reel and lifting it over the end of the reel. If the bight is moved axially toward the supported end of the reel, a thread turn is added to the number on the reel; if, on the other hand, the bight is moved axially toward the unsupported end of the reel, a thread turn is subtracted from the number on the reel.

These methods are illustrated in Figures 29 and 30 and Figures 31 and 32.

In Figures 29 and 30 the thread 19 is shown as passing over and between two adjacent reels 21a and 21b which are rotating in a direction indicated by the arrow. The operator engages the thread passing from the preceding reel to the succeeding reel and forms a bight therein as shown. By passing the bight around the unsupported end of the reel in the direction of rotation he in effect lifts another turn of thread onto the reel, thus adding to the number thereon. In the method illustrated in Figures 31 and 32, the operator passes the bight around the reel counter to the direction of rotation of the reel. In effect, he lifts a turn of thread off the reel, thus subtracting a turn from the number on the reel. Alternately, the number of thread turns on the reel may be reduced by drawing a plurality of turns axially therefrom.

As many turns of thread may be added or subtracted as may be desired without interrupting the travel of the thread: in this manner, the time of processing to which the thread is subjected on the reel may be increased or decreased as desired.

When one or more turns of thread are thus removed from a preceding reel, the slack occasioned as the thread passes to a succeeding reel is quickly taken up due in part to tension in the thread. When turns of thread are added to a reel while the thread is passing therefrom to a succeeding reel, the additional thread for the added turns is supplied from the thread on and passing to the succeeding reel by an increase in the tension in such thread. In a very short time, such tension changes are equalized. Of course, no difficulty whatsoever results if the thread is passing from the preceding reel to a succeeding device which draws the thread impositively; for instance, a twisting device such as a cap- or ring-twister.

The methods of manipulating the thread made possible by the present invention require for their performance only a few seconds of the operator's time. In view of the large numbers of reels employed in a commercial plant, this is particularly important in the starting of the thread on the reels and transfer of the thread therebetween. Numerous modifications may be made in the methods above described and other methods may be employed without departing from the spirit of the invention.

It is intended that the patent shall cover, by suitable expression in the appended claims, whatever features of patentable novelty reside in the invention.

What is claimed is:

1. The method of transferring thread from one to another of two unilaterally supported self-threading thread store devices each of which is adapted to advance the thread toward the unsupported end thereof in generally helical turns comprising permitting several turns of thread to accumulate in the form of an annular bundle at the unsupported end of the first of said devices, drawing said annular bundle axially off the device, and directing the thread back of said annular bundle to the second of said devices.

2. The method of transferring thread from one to another of two unilaterally supported self-threading thread store devices each of which is adapted to advance the thread toward the unsupported end thereof in generally helical turns comprising permitting several turns of thread to accumulate in the form of an annular bundle at the unsupported end of the first of said devices, removing said annular bundle and a portion of the thread back of said annular bundle from said first device, and starting said portion of thread upon the second of said thread store devices.

3. The method of transferring thread from one to another of two unilaterally supported self-threading thread store devices each of which has a periphery made up of a plurality of bar members which cooperate to advance the thread toward the unsupported end thereof in generally helical turns comprising permitting several turns of thread to accumulate in the form of an annular bundle at the unsupported end of the first of said devices, removing said annular bundle from the unsupported end of said first device, and, without severing the thread in the meanwhile, bringing the thread extending between the succeeding turns of thread on said first thread store device and said annular bundle into contact with the second of said thread store devices.

4. The method according to claim 3 in which the step of bringing the thread into contact with the second of said thread store devices is effected by looping the thread extending between the succeeding turns on said first thread store device and the annular bundle at least once about the periphery of the second of said thread store devices.

5. The method according to claim 3 in which the step of bringing the thread into contact with the second of said thread store devices is effected by engaging the thread extending between the succeeding turns on said first thread store device and the annular bundle between two or more of the bar members making up the periphery of the second of said thread store devices.

6. The method of transferring thread from one to another of two unilaterally supported self-threading thread store devices each of which has a periphery made up of a plurality of bar members which cooperate to advance the thread toward the unsupported end thereof in generally helical turns comprising permitting several turns of thread to accumulate in the form of an annular bundle at the unsupported end of the first of said devices, removing said annular bundle from the unsupported end of said first device, severing the thread, and bringing the new leading end of the thread into contact with the second of said thread store devices.

7. The method according to claim 6 in which the step of bringing the thread into contact with the second of said thread store devices is effected by looping the new leading end of the thread at least once about the periphery of the second of said thread store devices.

8. The method according to claim 6 in which the step of bringing the thread into contact with the second of said thread store devices is effected by engaging the new leading end of the thread between two or more of the bar members making up the periphery of the second of said thread store devices.

WALTER F. KNEBUSCH.
ALDEN H. BURKHOLDER.